April 16, 1935. E. L. WALL 1,997,891
UNIVERSAL DIE SINKING ATTACHMENT FOR HORIZONTAL MILLING MACHINES
Filed Dec. 12, 1933 4 Sheets-Sheet 3
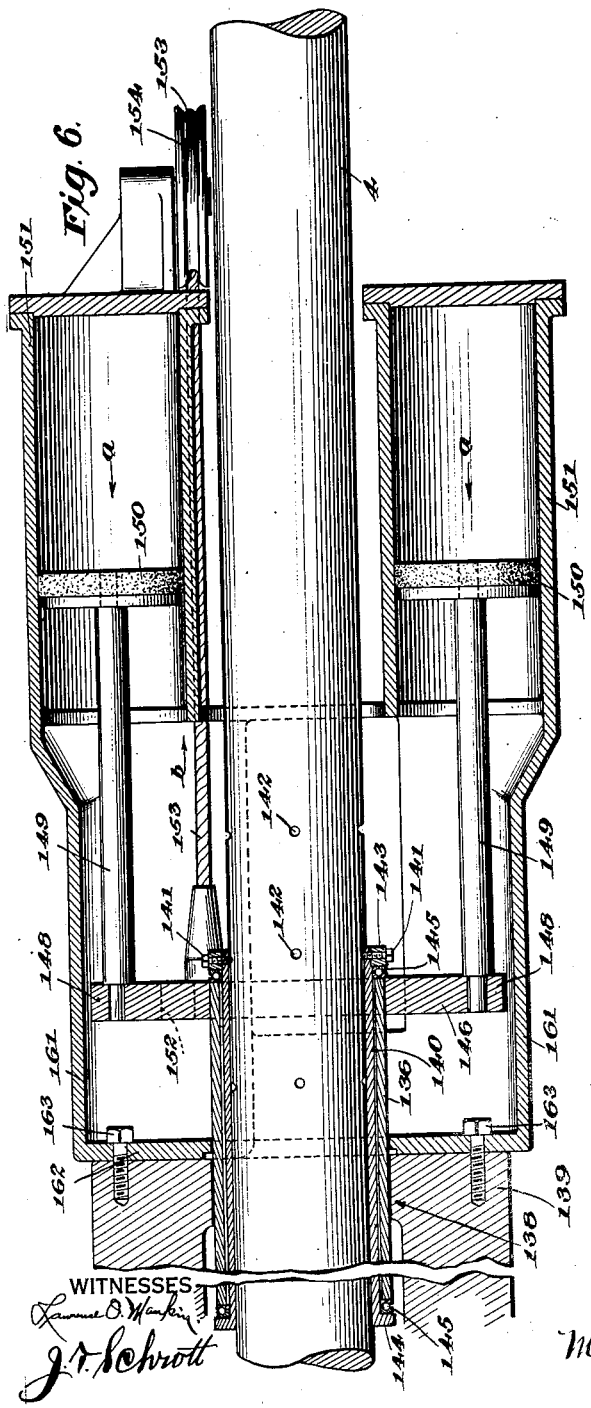
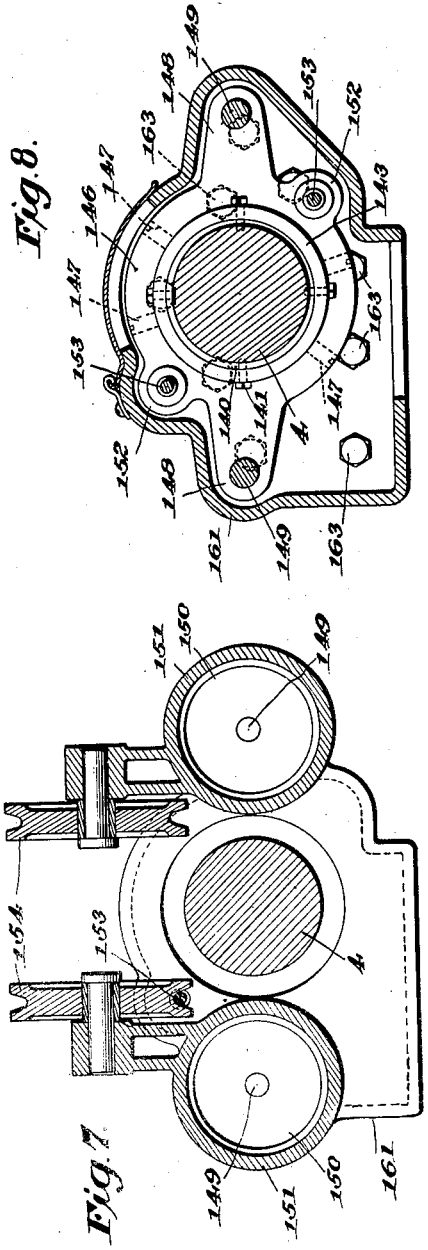
INVENTOR
Edmund L. Wall
BY
Munn Anderson Stanley Foster & Liddy
ATTORNEYS

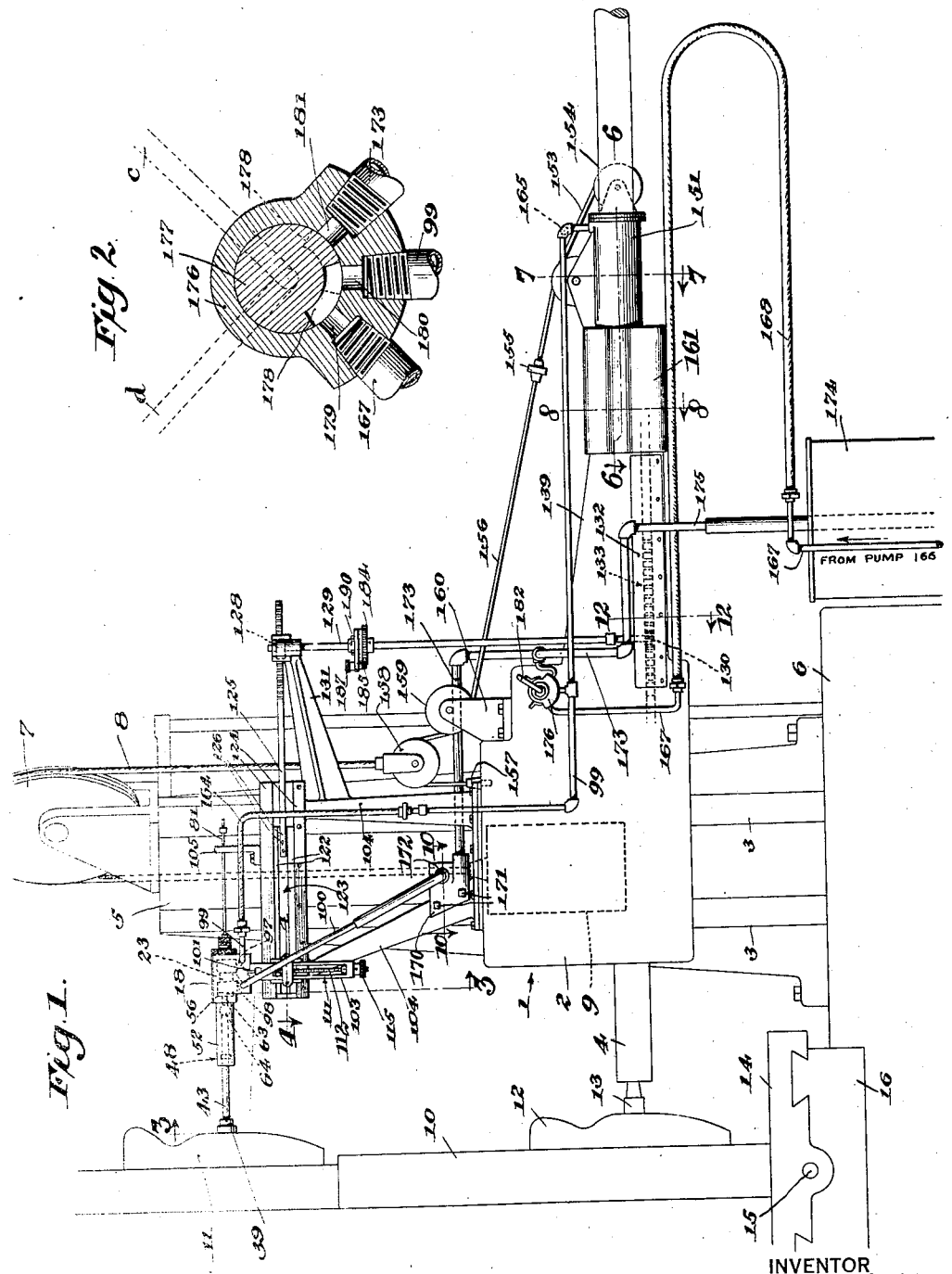

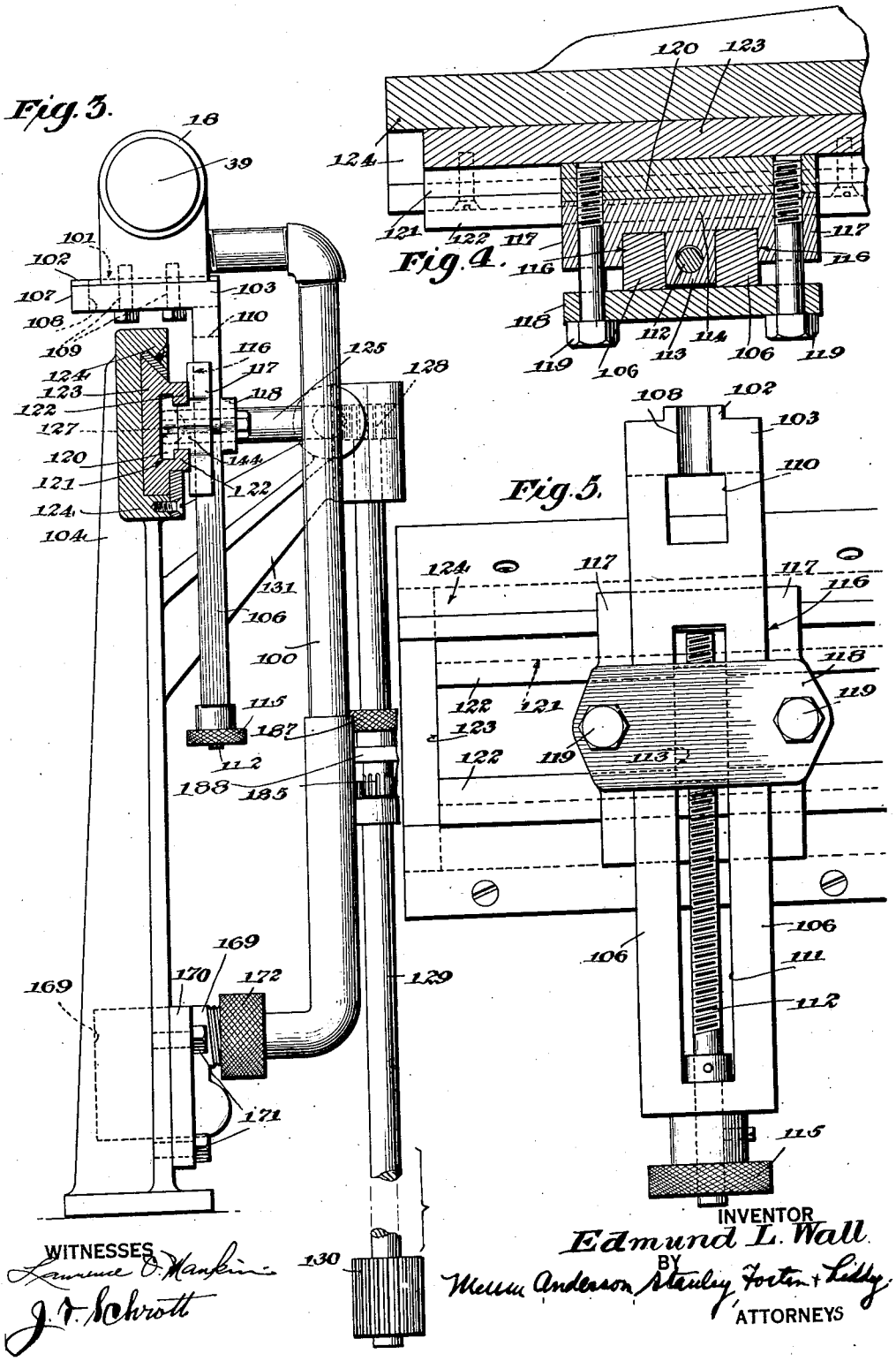

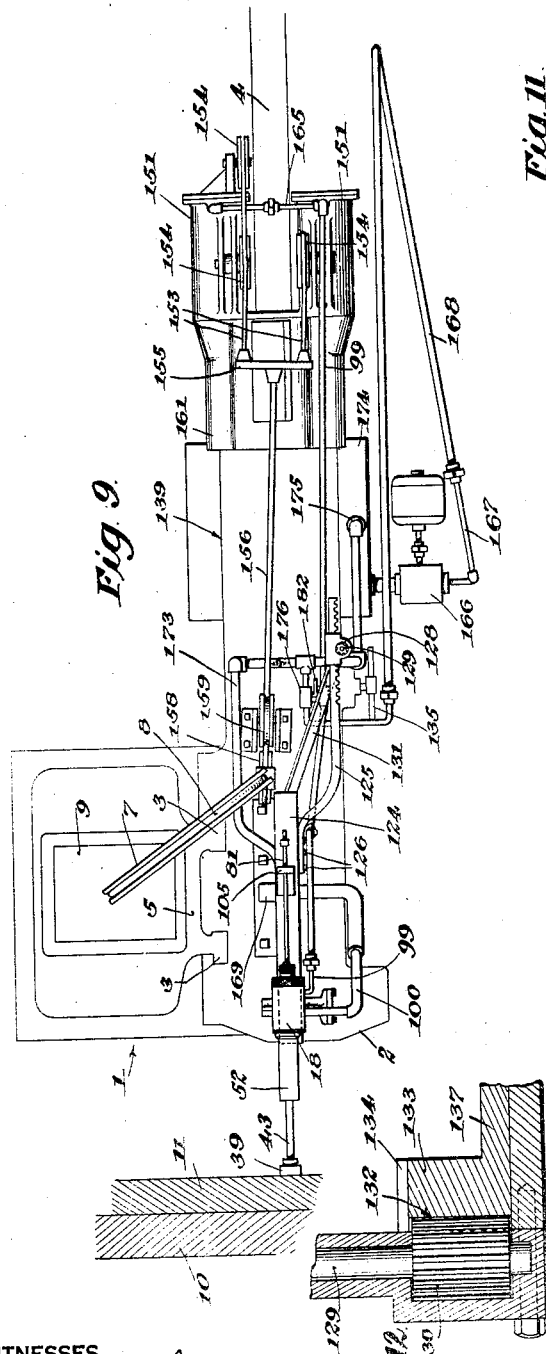

Patented Apr. 16, 1935

1,997,891

UNITED STATES PATENT OFFICE 1,997,891

UNIVERSAL DIE SINKING ATTACHMENT FOR HORIZONTAL MILLING MACHINES

Edmund Leo Wall, Detroit, Mich., assignor, by mesne assignments, to R. W. Glasner, Chicago, Ill.

Application December 12, 1933, Serial No. 702,040

27 Claims. (Cl. 90—13.5)

This invention relates to improvements in duplicating machines, and its objects are as follows:—

First, to convert any horizontal boring mill, milling machine or lathe into a modelling or duplicating machine by use of relatively simple and inexpensive attachments, and this without disrupting the machine from its regular line of work.

Second, to enable any ordinary mechanic to perform the highly specialized work of a duplicating machine operator, the only requirement being a brief practice with the foregoing attachment to master its simple technique.

Third, to utilize the tracer mechanism of a companion application as the means for converting a known type of horizontal milling machine into a modelling machine, said mechanism automatically controlling the cutter bar or other profiling means and eliminating the chance of error on the part of the operator.

Fourth, to make the chief point of connection of the modelling attachment in such a way that the conflicting weight pull and pressure fluid push are neutralized, the only additional strain on the spindle of the known machine being that of pushing the cutter to and from the work.

Fifth, to provide a pair of simple cylinders and pistons for equalizing the pressure on the yoke in one direction, the fact of the cylinders being simple making for cheapness in manufacture, an additional advantage in their mode of connection with the head of the known machine being that they can be brought up a little closer to the head than in a companion application and so reduce the distorting strain on the vertical guides and boring bar to a minimum.

Sixth, to substitute the foregoing pair of cylinders for the single cylinder of the companion application and thereby facilitate the mounting of the necessary sheaves and the like by which the cables are guided to the point of connection with the yoke.

Seventh, to interpose in the cable connection between the weight and yoke a multiple tackle system which materially reduces the weight as far as its pull on the yoke is concerned, so that a relatively low pressure pump can be used and a relatively low pressure maintained in the fluid line, thus avoiding the necessity of having to use a high pressure pump both to counteract the back pressure on the fluid line and avoid the danger of overheating the oil at high pressure.

Eighth, to provide a hand control in the nature of a three-way valve in the fluid line for enabling backing the tracer-cutter couple from the pattern and work should the need for doing so suddenly occur, or for initially moving the couple up to the pattern and work.

Ninth, to couple what might be called a precision measuring link between the cutter and tracer means to enable an adjustment of said tracer means with respect to the cutter in the event of wanting to go over a cut for the removal of an additional amount of material from the work.

Tenth, to couple the tracer mechanism directly with the boring bar through the medium of rack and gear connections or their equivalents.

Eleventh, to provide the gib by which the boring bar is moved back and forth in the known machine with an extra rack to comprise one of the foregoing connections, the normal feed not being altered in any way although temporarily disconnected for the automatic operation herein contemplated.

In the drawings:—

Figure 1 is a front elevation of the die sinking attachment on a horizontal boring mill which by use of the attachment is converted into a modelling or duplicating machine, the horizontal boring mill being shown in light lines.

Figure 2 is a sectional view of a three-way valve which provides a hand control.

Figure 3 is a detail vertical section taken on the line 3—3 of Figure 1, chiefly illustrating the adjustments of the tracer cylinder with respect to its slide plate.

Figure 4 is a detail horizontal section taken on the line 4—4 of Figure 1.

Figure 5 is a detail front elevation of the yoke shown in Figure 1.

Figure 6 is a horizontal section taken on the line 6—6 of Figure 1.

Figure 7 is a cross section taken on the line 7—7 of Figure 1.

Figure 8 is a cross section taken on the line 8—8 of Figure 1.

Figure 9 is a plan view of the apparatus seen in Figure 1.

Figure 10 is a cross section taken on the line 10—10 of Figure 1.

Figure 11 is a cross section taken on the line 11—11 of Figure 10.

Figure 12 is a cross section taken on the line 12—12 of Figure 1.

Figure 13 is an elevation of the foregoing precision measuring link, showing how it is coupled in the shaft between the cutter and tracer means.

The die sinking attachment shown in its entirety in full lines in Figures 1 and 9, is especially adapted to horizontal boring and drilling machines. Its underlying purpose as regards this machine or any other horizontal boring mill, milling machine or lathe, is to make a conversion into a modelling or duplicating machine. A shop having a horizontal boring mill which is intended for a restricted class of work, can have the advantage of an expensive modelling or duplicating machine, the addition of the attachment making it possible to reproduce any pattern within the limits of the boring mill.

The horizontal boring mill which is herein used as an example is generally designated 1. This includes a head 2 which is movable up and down on guides 3. A long boring bar 4 is carried by the head 2. This bar is revolved by mechanism inside of the head, but the nature of the specific mechanism is of no concern here. The boring bar is freely slidable endwise and it is one of the purposes of the attachment to cause the sliding.

A standard 5 of which the guides 3 are a part, rises up from one end (the right end) of a heavy fixed base 6. The standard 5 is surmounted by a sheave 7. A cable 8 is guided over the sheave, and it has a heavy weight 9 suspended from one end of it. One purpose of the weight 9 is to counterbalance the head 2, but instead of attaching the remaining end of the cable 8 to the head 2 as it is in the original machine, that free end is combined with a multiple tackle system the specific purpose of which is to lessen the pump requirements of the hydraulic or other pressure fluid element of the attachment necessary to counteract the weight 9.

A bed 10 provides a pattern and work support. The pattern 11 and work 12 are secured to the bed one above the other. The fundamental object of the modelling attachment is to reproduce the profile of the pattern in the work, and for the latter purpose the boring bar 4 carries a cutter 13. The bed 10 is mounted on a table 14. This has a cross feed 15, either mechanically or manually operated, for steadily moving the bed 10 crosswise of the base 6 first in one direction and then in the other. This movement occurs directly with respect to a carriage 16 which is longitudinally adjustable along the base 6.

Attention is directed to the details of the attachment. This begins with a tracer valve casing 18. The principle and construction of this valve casing are fully disclosed in my copending application, filed February 26, 1931, Serial No. 518,528. Essentially it contains a piston type valve plunger 23 (Fig. 1). This is in the nature of a sleeve or spool valve which is movable endwise in the valve casing 18 by the fluctuations of a tracer tip 39.

Actual details of the tracer mechanism of which the valve casing 18 is a part are disclosed in my co-pending application, filed December 12, 1933, Serial No. 702,039. These details include an extension tracer bar 43 (Fig. 1) by which the tip 39 is revolubly carried. This bar has a midbearing or fulcrum 48 in a tube 52 which is secured to the valve casing 18, otherwise known as a central body. A disc 56 abuts the left end of the piston type valve plunger 23. The valve structure is pressed against the disc by a spring (not shown), the tension of which is adjustable. The disc is carried by a shank 63, and the shank is connected with the inner end of the bar 43 by a universal joint 64. A rod 81 is connected to the valve structure. This rod has a stop near the outer end. Its purpose is that of an automatic fluid release, and in operation it prevents the cutter 13 from reaching a low point and therefore from damaging the bed 10.

There are pressure fluid inlet and outlet openings in the valve casing 18. These are designated 97, 98. A fluid pressure pipe line includes pipes 99 and 100. The first is the supply, the second the exhaust. It is the purpose of the valve plunger 23 to control communication between the inlet 97 and outlet 98. The valve structure is an increment of the tracer tip 39, and the extent of rising and falling of the latter over eminences and into depressions on the face of the pattern 11 determines the amount of opening and closing of the pipe line through the tracer valve casing 18.

A groove 101 (Figs. 1 and 3) on the underside of the tracer valve casing 18, or more properly on the underside of the heavy bottom of which the tracer cylinder is a part, receives the rib 102 (Fig. 5) of a yoke 103. This yoke appears like an inverted L (Fig. 3). Its long vertical leg extends down in front of a standard 104. This standard carries a bracket 105 (Fig. 1) with which the stop on the rod 81 is engageable to cause the automatic fluid release previously mentioned. The vertical leg is designated 106. The short horizontal leg is designated 107. It is this leg which has the rib 102, and both the leg and rib are slotted at 108 (Fig. 5) to receive bolts 109 by which the cylinder is secured to the yoke. A hole 110 (Fig. 5) in the leg 106 communicates with the slot 108 and provides a place through which to get at the heads of the bolts.

The leg 106 is slotted up its middle at 111 (Fig. 5) to make room for an adjusting screw 112 as well as to provide guides for a spline 113 (Fig. 4) with which the screw has a threaded connection. The spline is part of a block 114. The screw has a swivel connection with the bottom end of the yoke 103, and the means which comprises the swivel connection includes a knurled hand wheel 115 by which to turn the screw when turning is permitted. The purpose of turning the screw is to raise and lower the tracer valve casing 18 and its immediately carried parts.

The block 114 is recessed at 116 to receive the yoke 103. The spline 113 stands out from the bottom of the recess and fits in the slot 111 as already brought out. The recess 116 produces sides 117 which flank the vertical leg of the yoke. The height of the spline 113 is approximately equal to the height of a clamp plate 118 (Fig. 5). The ends of this have holes to receive bolts 119 by which the yoke is clamped tightly against the block 114.

These bolts screw into a nut plate 120 (Figs. 3 and 4) which fits in the passage 121 behind parallel tongues 122 respectively in and on a transversely slidable slide plate 123 (Figs. 1 and 3). This plate is freely slidable in the ways 124 of the standard 104. When the plate 123 slides in its ways the tracer cylinder 18 moves with it because the clamping arrangement by which the yoke 103 is attached to the slide plate virtually makes it and the tracer cylinder a single unit. Vertical adjustments of the tracer cylinder with respect to the plate 123 are made by first loosening the bolts 119 and then turning the hand wheel 115. Horizontal adjustments are made by loosening the bolts 119 and shifting the nut plate 120 in the passage 121 to a new place.

A rack bar 125 is secured to the slide plate 123 as at 126 (Fig. 1). The bar is round in cross section, but a part of it is flattened at 127 (Fig. 3) where it lies against the plate 128. The free rack end of the bar 125 meshes with a gear 128 on the upper end of a shaft 129. This shaft has a similar gear 130 on its lower end (Fig. 1). The shaft 129 is supported in suitable bearings, one of these being carried by an arm 131 (Fig. 1) which extends out from the standard 104. A precision measuring link, later described in detail, is coupled in the shaft 129 to enable adjustments of the tracer means relatively to the cutter.

The gear 130 meshes with a rack 132 (Figs. 1 and 12) on the side of what is known as a gib 133 in the existing machine. This gib already has a rack 134 on top. A hand wheel 135 (Fig. 9) known as the spindle quick advance and return on the existing machine has a gear wheel (not shown) in mesh with the top rack 134 for the purpose of shifting the spindle 136 (Fig. 6) also of the existing machine back and forth. The provision of the side rack 132 (Figs. 1 and 12) is to be understood as the modification of the gib to enable the adaptation of the attachment. The hand wheel 135 (Fig. 9) is simply uncoupled from the top rack 134, and what was originally a manual function in shifting the spindle 136 is now the automatic function of the tracer mechanism, the latter being connected to the spindle by the gear 130.

Of necessity the gib 133 (Fig. 12) is fixedly attached to the spindle 136 (Fig. 6). The attachment is made through an arm 137 (Fig. 12) by means of bolts (not shown). The foregoing shifting of the spindle 136 comprises endwise sliding in bearings 138 (only one shown) of the existing machine (Fig. 6). These bearings are housed in an extension 139 of the head 2 (Fig. 1). Inside of the spindle there is a sleeve 140 also of the existing machine. This has a close fit on the boring bar 4. It is removably secured to it by a plurality of bolts 141, the points of which enter depressions 142 in the boring bar.

There is a series of these depressions spaced lengthwise of the boring bar, the purpose of the series being to enable adjusting the boring bar into any wanted position (within limits) with respect to the sleeve 140. In addition to making connection with the boring bar 4 the bolts 141 also secure one of a pair of collars 143, 144 to the sleeve 140. The collar 143 is separate but the collar 144 is integral with the sleeve. The collars are at the extremities of the sleeve, and there are thrust bearings 145 between them and the ends of the spindle 136.

Sliding motion is imparted to the spindle 136 through a yoke 146 (Figs. 6 and 8) which is part of the modelling attachment. The yoke is secured to the right end of the spindle by a plurality of set screws 147 (Fig. 8). The yoke includes side arms 148 to which the rods 149 of pistons 150 are secured.

These pistons work in cylinders 151. There is a pair of cylinders, as is obvious, and the purpose of the pair is to equalize the push in the direction of arrows $a$, (Fig. 6) by force of the fluid pressure in the right ends of the cylinders. This force tends to push the boring bar 47 left (Fig. 1), cutter 13 into the work 12, and the tracer tip 39 against the pattern 11.

The yoke 146 has diagonal offsets 152 (Fig. 8) for the attachment of the inner ends of cables 153. These cables are guided over a suitably arranged set of sheaves 154 (Figs. 1 and 9). The outer ends of the cables are secured to a connector 155 (Figs. 1 and 9) which, in turn, has connected to it at a central point one end of a single cable 156 constituting a takeoff. The other end of this cable is anchored to the head 2 at 157 (Fig. 1).

But before being anchored there it is trained over and under a pair of sheaves 158, 159 (Fig. 1) which with the cable 156 comprise the multiple tackle system mentioned before. The sheave 158 is suspended from the free end of the cable 8. The sheave 159 is carried by a bracket 160 which is secured to the head 2. The weight 9, acting through the various cable connections which finally end at the offsets 152 (Fig. 8), tends to pull the boring bar 4 to the right (arrow $b$, Fig. 6), the cutter 13 away from the work 12 and the tracer tip 39 away from the pattern 11.

The weight and the pressure fluid counteract each other, but one may predominate over the other. The tracer mechanism does the controlling, either letting the weight or the pressure fluid predominate. However, the tracer mechanism is controlled by the pattern 11.

The cylinders 151 are part of a casting 161 (Fig. 6) which is flanged at 162 to take bolts 163 by which the casting is fixedly secured to the extension 139. The casting and consequently the cylinders are, therefore, fixed as far as endwise movement is concerned. That part of the casting next to the extension is more in the nature of a box, being large enough as well as appropriately shaped (Fig. 8), to contain the yoke 146.

The pressure fluid pipe line, specifically comprising the supply pipe 99 and the exhaust pipe 100 actually includes more detailed structure. The pipe 99 has a flexible section 164 connected in it (Fig. 1) to accommodate the horizontal movements of the tracer valve casing 18. The pipe 99 continues on to a common connection 165 (Fig. 9) which supplies the right ends of both cylinders 151 with pressure fluid. This is supplied by a motor driven pump 166 (Fig. 9). The pipe leading from the pump is designated 167. This includes a flexible section 168 which accommodates up and down movements of the head 2.

The exhaust pipe 100 (Fig. 1) is telescoped, the purpose being to adapt itself to the horizontal movements of the tracer valve casing 18. The bottom end of it enters a fitting 169 (Fig. 10) which is flanged at 170 and secured therethrough to the standard 104 by means of bolts 171. The exhaust pipe enters the fitting through a gland 172 which is adapted to be loosened and tightened. The purpose of loosening is to enable adjustments of the exhaust pipe with respect to the fitting 169 when the cylinder 18 is adjusted along the short horizontal leg 107 (Fig. 3).

A continuation 173 (Fig. 2) of the exhaust pipe 100 discharges into a sump 174. The pump 166 draws the fluid from the sump and discharges it into the fluid system under pressure. In practice there is a by-pass valve between the pump and sump for the return of fluid under excessive pressure. The continuation 173 includes a telescopic section 175 (Fig. 1) which adapts itself to the up and down movements of the head 2. A three-way valve 176 (Figs. 1 and 2) provides a hand control for superseding the automatic control of the traced mechanism. This comprises a valve member 177 with a passage 178 long enough to bridge any two of the three ports 179, 180, 181 at which the respective pipes 167, 99 and 173 make connection with the valve housing. There is a handle 182 for turning the valve member into either of its two positions.

Position c (Fig. 2) of the handle 182 places the passage 178 so that pressure fluid will flow into the pipe line 99 from the pump by way of the pipe 167 and ports 179, 180. The normal return flow of fluid occurs into the exhaust pipe 100 as permitted by the valve structure 23. Should it be desired to suddenly back the tracer mechanism as well as the cutter from the pattern and work respectively the handle 182 (Fig. 1) is thrown over to position d, (Fig. 2) so that the passage 178 bridges the ports 180, 181. Pressure fluid from the pipe line 99 is diverted directly in the exhaust continuation 173 into which it flows from the cylinders 151 with the force of the weight 9 behind it.

At this place it is necessary to return to parts of the foregoing description to amplify some of its features. The yoke 146 (Fig. 6) is the chief point of connection of the modelling attachment to the horizontal boring mill insofar as concerns the control of the mill by the attachment.

Obviously it is necessary to impose pushes and pulls on the yoke 146 first by force of the pressure fluid (arrows a, Fig. 6), second by force of the weight (arrow b), but these forces are so nearly neutralized by the yoke which constitutes a common connector that the only additional strain on the thrust bearing 145 and on the spindle 136 is that actually required to slide the boring bar 4 and move the cutter 13 to and from the work 12.

Note must be made of the fact that the cylinders 151 (Figs. 6 and 7) flank the boring bar 4. This is an arrangement incidental to the dual and equalized connection of the pistons 150 with the yoke 146. The cylinders 151 have an important purpose other than the means for applying the force of fluid pressure at two points of the yoke, namely that of providing convenient mountings for the sheave supports so that the positioning of these is facilitated with respect to the rest of the structure.

As far as the cylinders 151 are concerned these are of a simple nature, that is to say, they are plain cylinders which are readily manufactured by known processes. Even counting in the casting 161 it is possible to bring up the cylinder assemblage a little closer to the head 2, more specifically to its extension 139, than would be possible with the equivalent type of cylinder in the companion application 518,528. It is desirable to get the cylinders as close to the head as possible thereby to reduce the distorting strain on the vertical guides 3 (Fig. 1) and the boring bar 4 to a minimum.

The multiple tackle system (Fig. 1) enables the use of a relatively low pressure pump 166 (Fig. 9) which, in turn, enables doing the necessary work with but a relatively low fluid pressure in the pipe line. This is an advantage in that it materially reduces the effect of the weight 9 insofar as its pull on the yoke 146 (Fig. 6) is concerned. The weight 9 weighs approximately four thousand pounds. Its original purpose was to counterbalance the head 2, but its present additional purpose is to pull the boring bar 4 to the right all as fully brought out before.

It is desirable not to alter the existing machine any more than necessary, and if the machine were altered by the substitution of a lighter weight then the machine would not be ready for ordinary boring, drilling and milling. Since the weight is used to pull on the boring bar in opposition to the fluid pressure, it follows that if it were connected directly to the bar the requirement would be fluid pressure at approximately four thousand pounds to balance.

The multiple tackle system cuts the effective weight approximately in half. A two inch movement of the pistons 150 (Fig. 6) under fluid pressure would produce approximately only one inch of upward movement of the weight 9. Therefore, according to a common principle of leverage only half the force required to directly move the weight 9 is necessary to be applied to the pistons 150.

Attention is directed to Figure 13. This illustrates the so-called precision measuring link referred to before. The device is actually a micrometer which enables fine adjustments of the top end of the shaft 129 with respect to the bottom end. To this end the shaft is split at 183.

A gear 184, secured to the bottom shaft meshes with a pinion 185 on the shaft 186 of the knurled wheel 187. This shaft is journaled on a plate 188 which is secured to the top shaft.

A circular boss 189, almost as great in diameter as the gear 184, stands up from the gear and contacts the underside of the plate 188 against which it is loosely held by bolts 190.

The heads 191 of these bolts occupy a circular T slot 192 in the gear and its boss. The bolts are inserted through at least one square hole 193, whereupon the heads are slid around to the proper radial positions where they will match with the holes in the plate 188 preparatory to final assemblage. Upon turning the wheel 187 the pinion 185 will "walk" around the gear 186 and cause turning of the plate 188 and top shaft relatively to the gear 184. The adjustment will shift the slide plate 123 and consequently the tracer means to the right or left, usually to the right, with respect to the cutter 13, and the purpose of the adjustment is to cut a little more off from the face of the work.

The operation is readily understood. The head 2 (Fig. 1) is movable up and down on its guides 3 with a step motion by means not disclosed. All of the step motions will either be in the upward or downward direction. There will be a pause between each step of sufficient length to give the tracer tip 39 and cutter 13 time to traverse the pattern 11 and work 12. The tracer tip and cutter remain stationary as far as movement crosswise of the base 6 is concerned. It is the table 14 which moves crosswise of the base, and this carries the pattern and work with it. When the table 14 has ceased movement in one direction the head 2 takes a step either up or down whereupon the table 14 moves crosswise in the other direction and so on until the entire pattern and work have been traversed.

In case it is desired to take off say an additional one fourth inch from the face of the work 12 the tracer tip 39 is moved away from the pattern 11 by turning the wheel 187 (Fig. 13) counter-clockwise looking down. This operation shifts the slide plate 123 (Fig. 1) to the right and carries the tracer means with it. The adjustment would occur in an instance wherein the cutter 13 is made to cut across the work and it is desired to take a little more material off from the work in the same position of the cutter. The so-called precision link is located relatively low down on the shaft 129. This makes it easy for the operator to reach the wheel 187, and the provision of the link eliminates the necessity of the operator climbing up on the machine and attempting to make an adjustment in the tracer mount. It is not equipped for any precise measurements. In a few words, the precision link merely advances or retards the gear 128 (Fig. 1), and as a result merely advances or retards the tracer means.

The tracer and cutter mechanisms are harnessed together, so to speak, so that the movements of the two are identical. When the tracer tip 39 reaches a cavity in the pattern 11 and therefore tends to go to the bottom of the cavity, the cutter 13 will cut into the work 12 until it reproduces the cavity. This is because the tracer mechanism is directly coupled with the boring bar 4 through the medium of the rack 125, 132 and gear connections 128, 130 (Fig. 1). The manner in which this operation is carried out is easily explained:—

Imagine the pump 166 (Fig. 9) to be at work. This sets up a pressure in the pipe line 167, 168, 99 which can be traced to the right ends of the cylinders 151 (Fig. 6). As long as there is no outlet for the pressure fluid from the pipe line it is easy to see that the volume of fluid increases in the cylinders 151, and naturally with the pressure behind it pushes the pistons 150 and the boring bar 4 to the left (arrows a, Fig. 6). Since the boring bar 4 is supposed to be revolving it follows that the cutter 13 will continue to cut directly into the work 12 until it is stopped.

That is where the pattern 11 and tracer tip 39 come in. As long as the tracer tip 39 is over a cavity the cutter 13 will continue its cutting operation. Imagine the tracer 39 to have reached the bottom of the cavity. Its tendency is to keep on going because it is carried by the slide plate 123 which, in turn, partakes of the same movement as the boring bar 4.

Since the tracer tip is now stopped, the tracer valve casing 18 will move leftward relatively to it. This unseats the valve plunger 23 so as to open the inlet 97. Instead of all of the fluid going to the cylinders 50, 51 some of it escapes into the exhaust pipe 100 by way of the outlet 98. This diminishes the pressure in the cylinders 151 and enables the weight 9 to pull back on the boring bar 4 to an extent depending on the amount of escape or by-passing of pressure fluid at the outlet 98.

Presently the boring bar 4 will stop moving leftward. The weight 9 now predominates and tends to keep pulling the boring bar and tracer mechanism to the right. There is a limit to this because the spring (not shown) behind the valve plunger 23 always keeps the tracer tip 39 in contact with the pattern, even though very lightly, and its constant tendency is to keep the valve plunger seated so that there will be no by-passage of pressure fluid from 97 to 98.

Now with the tendency of the boring bar and tracer mechanism to move to the right by force of the weight 9 the pressure between the tracer tip and the pattern soon relaxes enough to let the valve plunger 23 close. It does not need to close all the way. It is on the amount of closing that refilling of the cylinders 150, 151 depends, and if the fluid pressure is again exercised upon the pistons 150 the weight 9 will be overcome so that the boring bar and tracer mechanism are again pushed to the left.

Imagine the tracer tip 39 to be traversing the pattern, or what is the same thing the pattern traversing the tracer tip, and the tracer tip encounters an eminence. There would be an intermediate opening of the valve plunger 23. The pressure fluid will be by-passed from the supply pipe 99 to the exhaust pipe 100. The reduction of pressure in the cylinders 151 (Fig. 6) has the same effect as before. The weight 9 pulls the boring bar 4 to the right and lets the cutter 13 reproduce the eminence.

Suppose the tracer tip and cutter should reach the end of the pattern and work and for want of something to stop them should be permitted to drop off. It has been brought out that the constant tendency of the pressure fluid is to drive the tracer-cutter couple to the left. The ways 124 (Fig. 1) are fixed insofar as that movement is concerned. If the tracer-cutter couple travels far enough to the left the stop on the end of the rod 81 will engage the bracket 105. The effect will be to displace the valve plunger 23 to the right. This opens the pressure pipe line to the exhaust and stops the movement of the tracer-cutter couple to the left.

Should a sudden need arise for backing the tracer cutter couple from the pattern and work the operator has only to throw the handle 182 of the three-way valve 176 to the position d (Fig. 2). This by-passes the fluid directly from the cylinders 151 and fluid system 99 into the sump 174.

Since the port 179 (Fig. 2) is now closed the pump pressure will not have an outlet into the fluid system, consequently its by-pass or relief valve (not shown) will open under the excessive pressure and release the fluid into the sump 174. The local circulation will continue until either the valve handle 182 (Fig. 1) is shifted back to position c (Fig. 2) or the pump motor is stopped. The weight 9 will then operate to pull the couple to the right. Movement of the handle to the position c (Fig. 2) returns the couple to the pattern and work. The stopping of the pump 166 leaves the tracer-cutter couple in any given position provided the valve plunger 23 is closed, and if the pump is stopped the valve plunger will presently close.

I claim:—

1. Means for converting a boring mill which has an endwise slidable, revoluble boring bar and cutter into a modelling machine, said means comprising fluid pressure controlled moving means to slide said bar in one endwise direction with respect to the work, moving means to slide said bar in the other endwise direction, and tracer means which is caused to vibrate by the profile of a pattern, said tracer means embodying a valve casing and a valve therein, the latter subject to the vibrations of the tracer and by its responses permitting varying quantities of the fluid past said valve to vary the force of one of the moving means.

2. Means for converting a boring mill which has an endwise slidable, revoluble boring bar and cutter into a modelling machine, said means comprising pressure fluid operable means to slide said bar in one endwise direction with respect to the work, reversely movable means including a weight with connections to the bar to slide said bar in the other endwise direction, tracer means which is caused to vibrate by the profile of a pattern, and a control for the pressure fluid operable means being responsive to the vibrations of the tracer to vary the effective force of the pressure fluid operable means.

3. Means for converting a boring mill which has an endwise slidable, revoluble boring bar and cutter into a modelling machine, said means comprising pressure fluid operable means to move said bar in one endwise direction with respect to the work, reversely movable means including a weight to move said bar in the other endwise direction, attaching means by which common connection of the opposing pressure fluid operable means and reversely movable means is made to the bar, tracer means which is caused to vibrate by the profile of a pattern, and a control for the pressure fluid operable means being responsive to the vibrations of the tracer to vary the effective forces of the pressure fluid operable means at said attaching means.

4. Means for converting a boring mill which has an endwise slidable, revoluble boring bar and cutter into a modelling machine, said means comprising at least two force-applying means tending to move said bar in opposite endwise directions with respect to the work, attaching means at which all of the force-applying means terminate and at which the conflicting forces are neutralized, said attaching means being carried by the boring bar, and tracer controlled means for varying the effectiveness of one of the force-applying means at said attaching means and consequently vary the effectiveness of the other force-applying means on said attaching means.

5. Means for converting a boring mill which has an endwise slidable, revoluble boring bar and cutter into a modelling machine, said means comprising at least two force-applying means tending to move said bar in opposite endwise directions with respect to the work, attaching means at which all of the force-applying means terminate and at which the conflicting forces are neutralized, said attaching means being carried by the boring bar, and control means for varying the effectiveness of both force-applying means as regards their individual ability to slide the bar in one or the other endwise direction.

6. Means for converting a boring mill into a modelling machine said mill having an endwise slidable, revoluble, boring bar with a rack-gib and cutter, said means comprising pressure fluid operable means to slide said bar in one endwise direction with respect to the work, a weight with connections to the bar to move it in the other endwise direction, the rack-gib moving as the bar slides, a tracer-operated valve structure to govern the pressure fluid operable means, the tracer being vibrated by the profile of a pattern, a slide plate which carries the valve structure, and connecting means between the slide plate and rack-gib to make said plate slide as the boring bar slides and so automatically actuate the valve structure due to the stoppage of the tracer by the pattern.

7. In a boring mill which has a vertically guided head and a boring bar endwise slidable and revoluble with respect to the head, said bar having a cutter; means to convert said boring mill into a modelling machine comprising a slide plate and means by which it is slidably supported on the head, pressure fluid operable means to slide said bar in one end-wise direction with respect to the work, a weight with connections to the bar to slide said bar in the other endwise direction, coupling means to couple the slide plate to the bar so that said plate slides as the bar slides, tracer means to abut a pattern and a valve structure to control the pressure fluid operable means, said structure abutting the tracer means, and means by which both the tracer means and valve structure are carried in common by the slide plate.

8. In a boring mill having an endwise slidable spindle and means for attaching it to the revoluble boring bar which has a cutter; means for converting said mill into a modelling machine said means comprising a tracer mechanism, means for coupling the tracer mechanism to the boring bar so that said mechanism moves as the bar slides, pressure fluid operable means to slide the sleeve in one endwise direction, a weight to slide said sleeve in the other endwise direction, a yoke secured to the sleeve being the common connector for the pressure fluid operable means and the weight, and a valve structure for controlling the pressure fluid operable means, said structure being included in the tracer mechanism and operable by the tracer thereof.

9. In a boring mill having a head and an extension thereof, a spindle endwise slidable in the extension and projecting therefrom, a boring bar and means to attach the spindle to the bar, said bar having a cutter; means for converting said mill into a modelling machine comprising at least one pressure fluid cylinder and means by which it is secured to the extension, a piston operable in the cylinder and means for securing it to the projection of the sleeve, a weight and connections also secured to said means, a pressure fluid line leading into the cylinder to push on the piston and said means in a direction opposite to the pull of the weight, tracer mechanism carried by the head, means coupling said mechanism and spindle so that the two move together, and a valve structure included in the tracer mechanism controlling the pressure fluid in the fluid line according to the vibrations of the tracer.

10. Means for converting a boring mill which has an endwise slidable, revoluble boring bar and and cutter into a modelling machine, said means comprising a pair of cylinders flanking the boring bar and stationary relatively thereto, pistons operable in the cylinders, a pressure fluid system to supply the cylinders and force the pistons in one direction, connecting means by which the pistons are connected with the boring bar, a weight and a cable joined with the connecting means to pull it in the opposite direction, sheaves of which at least one is carried by the cylinders over which the cable is trained to the place where it is joined to the connecting means, a valve structure for controlling the pressure fluid system, and a vibratory tracer for vibrating the valve structure.

11. In a boring mill having a head, a boring bar endwise slidable with respect to the head; pressure fluid operable means to slide said bar in one endwise direction, a weight to slide the bar in the other endwise direction, and a multiple tackle system for diminishing the effective fluid pressure to counteract the weight, said system comprising at least one cable, individual means by which the opposite ends of the cable are attached to the head and connected with the bar, and a pair of sheaves over and under which the cable is trained respectively connected to the weight and attached to the head.

12. In a boring mill having a head, guides on which it is movable, a weight to counterbalance the head, and a boring bar endwise slidable with respect to the head; means for utilizing the weight to slide the boring bar endwise in one direction comprising separate cables of which one end of the first cable is secured to the weight and the respective ends of the second cable are anchored to the head and connected with the bar, a tackle system comprising sheaves respectively carried by the remaining end of the first cable and by the head over and under which the second cable is trained, and pressure fluid operable means to slide the bar in the opposite direction, said tackle system diminishing the effectiveness of the weight as regards the boring bar and cutting down the pressure necessary to counteract the weight.

13. Means for utilizing the counterweight of the movable head of a boring mill to slide the boring bar slidably carried by said head in one direction, said means comprising cable connections commonly joining the weight, head and boring bar, pressure fluid operable means to slide the boring bar in the opposite direction, and a multiple tackle system included in said cable connections for reducing the effectiveness of the weight as regards the boring bar to approximately one-half.

14. In a boring mill having a vertically movable head, a counterweight for the head, an endwise slidable boring bar revolubly carried by the head and a normal feed for sliding the boring bar endwise to and from the work; means to replace the normal feed and to convert the mill into a modelling machine, said means comprising a take off from the weight for sliding the bar in one direction, pressure fluid operable means to slide the bar in the other direction, a tracer mechanism subject to vibration by a pattern, a valve structure which is correspondingly vibrated by the tracer of said mechanism to control the pressure fluid operable means, and means to couple the tracer mechanism to the bar.

15. In a boring mill having a head, a slidable boring bar revolubly carried by the head, and a normal feed for sliding the boring bar endwise to and from the work; means to replace the normal feed and convert the mill into an automatic modelling machine comprising two force-applying means acting on the bar and tending to slide it in opposite endwise directions, one of said force-applying means comprising pressure fluid operable means, a pressure fluid line and pump to supply said means with pressure fluid, and a manual valve in said line shiftable into either of two positions either to build up pressure in said pressure fluid operable means by connecting in the pump or by cutting out the pump and enabling the fluid to exhaust from the line.

16. In a boring mill having a head, an endwise slidable boring bar revolubly carried by the head, and a normal feed for sliding said bar back and forth with respect to the head; a pressure fluid control for replacing the normal feed, said control comprising pressure fluid operable means to slide the bar in one direction, a weight resisting said sliding, and means to cause either the building up or lowering of pressure in said pressure fluid operable means thereby either making the weight subservient or predominant.

17. A boring mill having a head and a slidable boring bar revolubly carried by the head, guides on which the head is vertically movable, a tracer mechanism by which the mill is converted into a modelling machine, said mechanism including a slide plate, a standard mounted on the head having ways to slidably carry said plate, and means to mount said tracer mechanism on the slide plate for adjustments in the direction of said guides.

18. Tracer mechanism comprising a cylinder, a yoke by which the cylinder is carried, a slide plate which is slidable to move the cylinder back and forth, ways on which said plate is slidable, and means for clamping the yoke to the slide plate.

19. Tracer mechanism comprising a cylinder, a yoke carrying the cylinder, a slide plate which is movable to move the cylinder, ways on which said plate is slidable, clamping means to secure the yoke to the slide plate, and means to adjust the yoke with respect to the clamping means upon temporarily loosening said clamping means.

20. A modelling machine comprising a cutter, tracer means to follow a pattern, apparatus which is controlled by the vibrations of the tracer means to make the cutter respond to reproduce the shape of the pattern in the work, and means to adjust the tracer means independently of the cutter from any given position of the cutter to enable taking off an additional amount from the work in any line of traverse of the tracer means and cutter.

21. A modelling machine comprising a boring bar, tracer means, an apparatus responsive to the tracer means and by its responses controlling the boring bar, and a micrometer adjustment coupled in said apparatus to reduce an adjustment of the tracer means relatively to the boring bar.

22. In a boring mill having a vertically movable head, counterbalancing means for the head, and endwise slidable boring bar revolubly carried by the head and a normal feed for sliding the boring bar endwise to and from the work; means to replace the normal feed and to convert the mill into a modelling machine, said means comprising mechanism for causing the counterbalancing means to slide the bar in one direction, pressure fluid operable means to slide the bar in the other direction, a tracer mechanism subject to vibrations by a pattern, a valve structure which is correspondingly vibrated by the tracer to control the pressure fluid operable means, and means to couple the tracer mechanism to the bar.

23. In a boring mill having a vertically movable head, counterbalancing means for the head, an endwise slidable boring bar revolubly carried by the head and a normal feed for sliding the boring bar endwise to and from the work; means to replace the normal feed and to convert the mill into a modelling machine, said means comprising mechanism for causing the counterbalancing means to slide the bar in one direction, pressure fluid operable means to slide the bar in the other direction, a tracer mechanism subject to vibrations by a pattern, a valve structure which is correspondingly vibrated by the tracer to control the pressure fluid operable means, coupling means between the tracer mechanism and said bar, and micrometer adjusting means included in said coupling means.

24. In a boring mill having a head, a slidable boring bar revolubly carried by the head, and a normal feed for sliding the boring bar endwise to and from the work; means to replace the normal feed and convert the mill into an automatic modelling machine comprising two force applying means acting on the bar and tending to slide it in opposite endwise directions, one of said force applying means comprising pressure fluid operable means, a pressure fluid line and pump to supply said means with pressure fluid, and means controllable at will to build up pressure in said fluid pressure operable means by controlling the operation of the pump with respect to the line.

25. In a combination with a boring mill having a head, an endwise sliding boring bar revolubly carried by the head; and a normal feed for sliding said bar back and forth with respect to the head; a pressure fluid control for replacing the normal feed, said control comprising fluid pressure operable means to slide the bar in one direction, means resisting said sliding, and means to cause either the building up or lowering of pressure in said pressure fluid operable means thereby either rendering the second recited means subservient or predominant.

26. A boring mill embodying a head and a slidable boring bar revolubly carried by the head, said head being also vertically movable, a tracer mechanism by which the mill is converted into a modelling machine, said mechanism including a slide upon which the tracer mechanism is mounted for movement therewith and for movement with respect thereto in directions transverse to the direction of sliding movement of the slide and also transverse to the direction of sliding movement of the boring bar, means connecting the boring bar and the tracer slide for movement in unison, and means in said connection to adjust the tracer means relative to the boring bar.

27. A boring mill embodying a head and a slidable boring bar revolubly carried by the head, said head being also vertically movable, a tracer mechanism by which the mill is converted into a modelling machine, said mechanism including a slide upon which the tracer mechanism is mounted for movement therewith and for movement with respect thereto in directions transverse to the direction of sliding movement of the slide and also transverse to the direction of sliding movement of the boring bar, means connecting the boring bar and the tracer slide for movement in unison, and a micrometer adjustment in said connection to adjust the tracer means relative to the boring bar.

EDMUND LEO WALL.